United States Patent [19]

Yoshiharu et al.

[11] Patent Number: 5,557,562
[45] Date of Patent: Sep. 17, 1996

[54] PORTABLE COMPUTER AND DOCKING DEVICE FOR PORTABLE COMPUTER

[75] Inventors: Uchiyama Yoshiharu, Isehara; Asano Takeshi, Atsugi; Fukuda Kaoru, Yokohama; Maeda Kazuhiko, Sagamihara; Usui Hideyuki, Chigasaki, all of Japan

[73] Assignee: International Business Machines Corporation, Armonk, N.Y.

[21] Appl. No.: 299,789

[22] Filed: Sep. 1, 1994

[30] Foreign Application Priority Data

Sep. 7, 1993 [JP] Japan .................... 5-221761

[51] Int. Cl.⁶ .......................... G06F 1/16; H05K 1/14; H05K 9/00
[52] U.S. Cl. .................. 364/708.1; 361/747; 361/818
[58] Field of Search ................... 364/708.1, 704, 364/705.01; 361/747, 818

[56] References Cited

U.S. PATENT DOCUMENTS

| | | | |
|---|---|---|---|
| 5,126,954 | 6/1992 | Morita | 364/708.1 X |
| 5,159,533 | 10/1992 | Kuang | 364/708.1 X |
| 5,175,671 | 12/1992 | Sasaki | 361/686 |
| 5,323,291 | 6/1994 | Boyle et al. | 361/683 |
| 5,377,357 | 12/1994 | Nishigaki et al. | 395/800 |

Primary Examiner—Roy N. Envall, Jr.
Assistant Examiner—Chuong D. Ngo
Attorney, Agent, or Firm—Andrew J. Dillon

[57] ABSTRACT

A notebook-type personal computer (hereinafter, personal computer) is provided with electrically conductive contact members, which are connected to a reference electric potential portion of a main body of the personal computer. The contact members are provided within concave portions which are formed at a bottom surface of the personal computer at a location which is separated from a connector. A docking device is provided with an engagement member which is electrically conductive and which is connected to a reference electric potential portion of a main body of the docking device and which can protrude from and withdraw into an opening. The opening is formed at a position which corresponds to the concave portion of the personal computer when the personal computer is completely loaded at the docking device. Because the contact members and the engagement member are provided at positions spaced apart from the connector, the electric potential difference between the personal computer and the docking device can be eliminated.

9 Claims, 8 Drawing Sheets

PORTABLE COMPUTER AND DOCKING DEVICE FOR PORTABLE COMPUTER

BACKGROUND OF THE INVENTION

1. Technical Field

The present invention relates in general to a docking device for a portable computer and in particular to a docking device for a portable computer at which a portable computer is loaded and fixed, which is electrically connected to the portable computer and which expands the various functions of the portable computer. Still more particularly, the present invention relates to a docking device for a portable computer in which radiated emission noise can be reduced easily and inexpensively.

2. Description of the Related Art

Portable computers such as notebook-type personal computers, which are structured so as to be compact and light-weight in view of the portability thereof, and docking devices for portable computers, which are connected mechanically and electrically to a portable computer and which expand various functions of the portable computer, have become popular in recent years. A portable computer and docking device are connected electrically for signal transmission between the docking device and the personal computer. A connector located at the rear surface of the portable computer and a connector located within the docking device contact each other to establish an electrical connection for signal transmission. The bodies of a portable computer and a docking device are both formed from electrically conductive materials such as carbon and nickel/copper (Ni—Cu) plating and both contain electrically conductive members such as circuit wiring. Therefore, when the portable computer and the docking device contact each other only at the connectors for signal transmission, a circuit is formed which is equivalent to a dipole antenna. In the equivalent circuit, the source of noise is the region of the connectors for signal transmission and the circuit elements include the body of the portable computer, the electrically conductive members accommodated therein, the body of the docking device, and the electrically conductive members accommodated therein. A problem arises in that when an electric potential difference arises between these elements, displacement current flows, emissions are radiated from the elements, and EMI (electromagnetic interference) occurs.

Conventionally, a sponge, which is coated with an electrically conductive material, has been interposed between the docking device for the portable computer and the portable computer so as to prevent EMI.

However, the body of the portable computer and the body of the docking device are coated so that the surfaces thereof are protected. Because the coated portions act as insulation, radiated emission noise cannot effectively be suppressed by the above structure.

SUMMARY OF THE INVENTION

It is therefore one object of the present invention to provide an improved docking device for a portable computer.

It is another object of the present invention to provide docking device for a portable computer in which radiated emission noise, which is emitted due to an electric potential difference between the portable computer and the docking device for a portable computer, can be reduced easily and inexpensively.

The foregoing objects are achieved as is now described. A notebook-type personal computer (hereinafter, personal computer) is provided with electrically conductive contact members, which are connected to a reference electric potential portion of a main body of the personal computer. The contact members are provided within concave portions which are formed at a bottom surface of the personal computer at a location which is separated from a connector. A docking device is provided with an engagement member which is electrically conductive and which is connected to a reference electric potential portion of a main body of the docking device and which can protrude from and withdraw into an opening. The opening is formed at a position which corresponds to the concave portion of the personal computer when the personal computer is completely loaded at the docking device. Because the contact members and the engagement member are provided at positions spaced apart from the connector, both the radiated emission noise and the electric potential difference between the personal computer and the docking device can be eliminated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9A illustrates a state in which the contact member and the engagement member of FIG. 8 are not contacting each other; FIG. 9B illustrates a state in which the contact member and the engagement member of FIG. 8 are contacting each other.

DETAILED DESCRIPTION OF PREFERRED EMBODIMENT

The embodiment of the present invention will be described in detail hereinafter with reference to the drawings.

Figure 1:
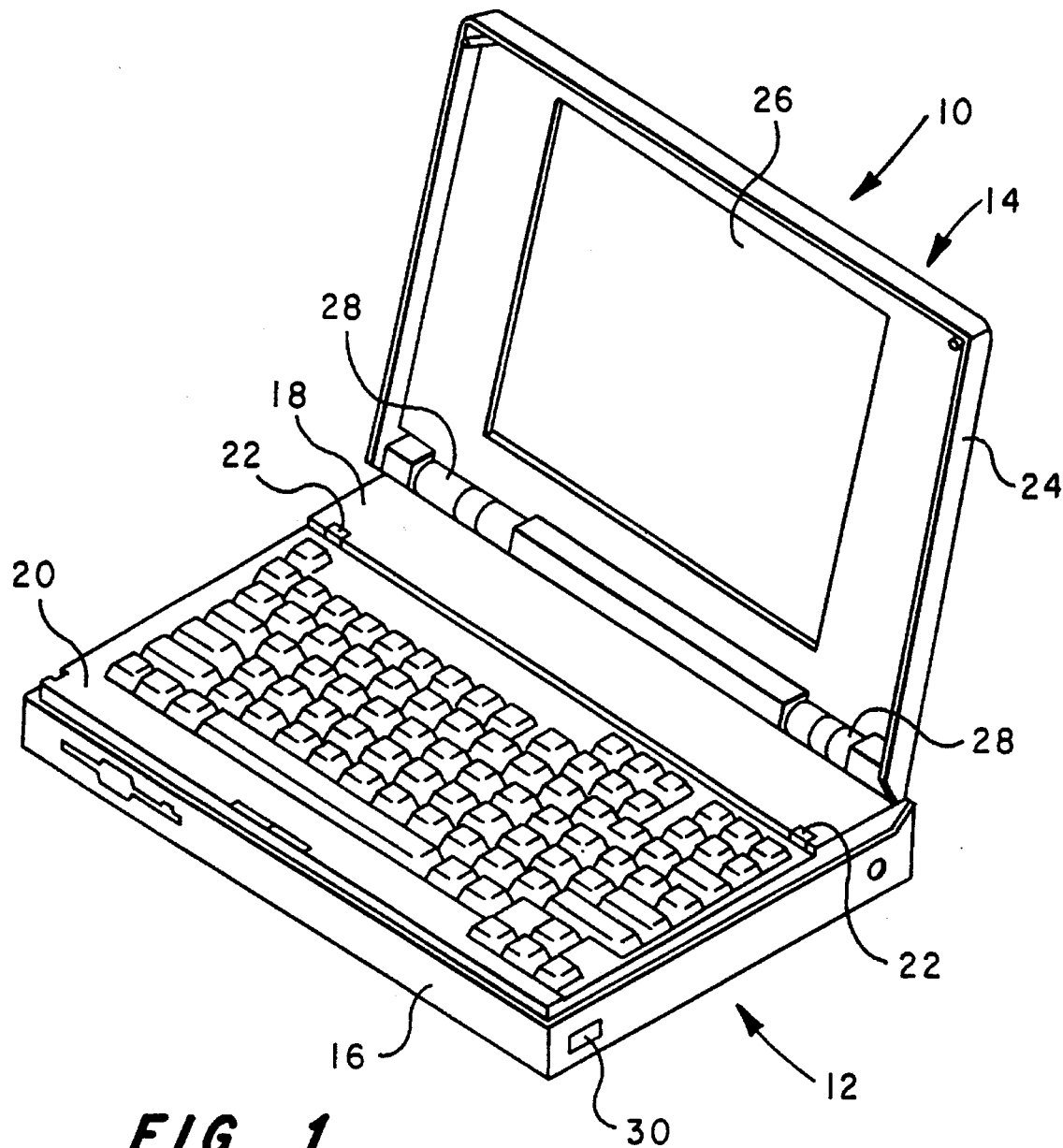
FIG. 1 is a perspective view illustrating an exterior of a notebook-type personal computer to which the present invention may be attached.

FIG. 1 illustrates a notebook-type personal computer 10 to which the present invention may be attached. Personal computer 10 includes main body 12 and cover 14. Main body 12 is formed of an electrically conductive material such as carbon and has a coated surface. Cover 14 is constructed so as to be openable and closable with respect to main body 12, and is likewise formed of an electrically conductive material with a coated surface. Cover 14 includes a shallow-bottom (double-bottom) case 24. A pair of cylindrical protrusions 28 are formed integrally with case 24 at the lower edge portion thereof. The pair of protrusions 28 are pivotally and axially supported at main body 12 so that cover 14 is hinge-connected to main body 12. Accordingly, cover 14 can be pivoted around the pair of protrusions 28. Liquid crystal display 26 is disposed at the central portion of cover 14 at the open side, i.e., the inside surface of cover 14.

Main body 12 includes case 16 which has a shallow bottom. A supporting plate 18 of a predetermined width is mounted to case 16 so as to cover the rear side of the upper surface of case 16. Keyboard 20 is installed at the front side of the upper surface of case 16. A pair of tongue-shaped protrusions 22 is formed integrally with keyboard 20 at the rear edge portion thereof. The pair of protrusions 22 is axially supported by the front edge portion of supporting plate 18 so that keyboard 20 is hinge-connected to the supporting plate 18. Accordingly, keyboard 20 can be pivoted around the pair of protrusions 22. Opening and closing cover 14 with respect to main body 12 and opening and closing of keyboard 20 with respect to case 16 of main body 12 are effected by a two-stage operation of opening/closing operation portion 30 located on the side of case 16.

Figure 2:
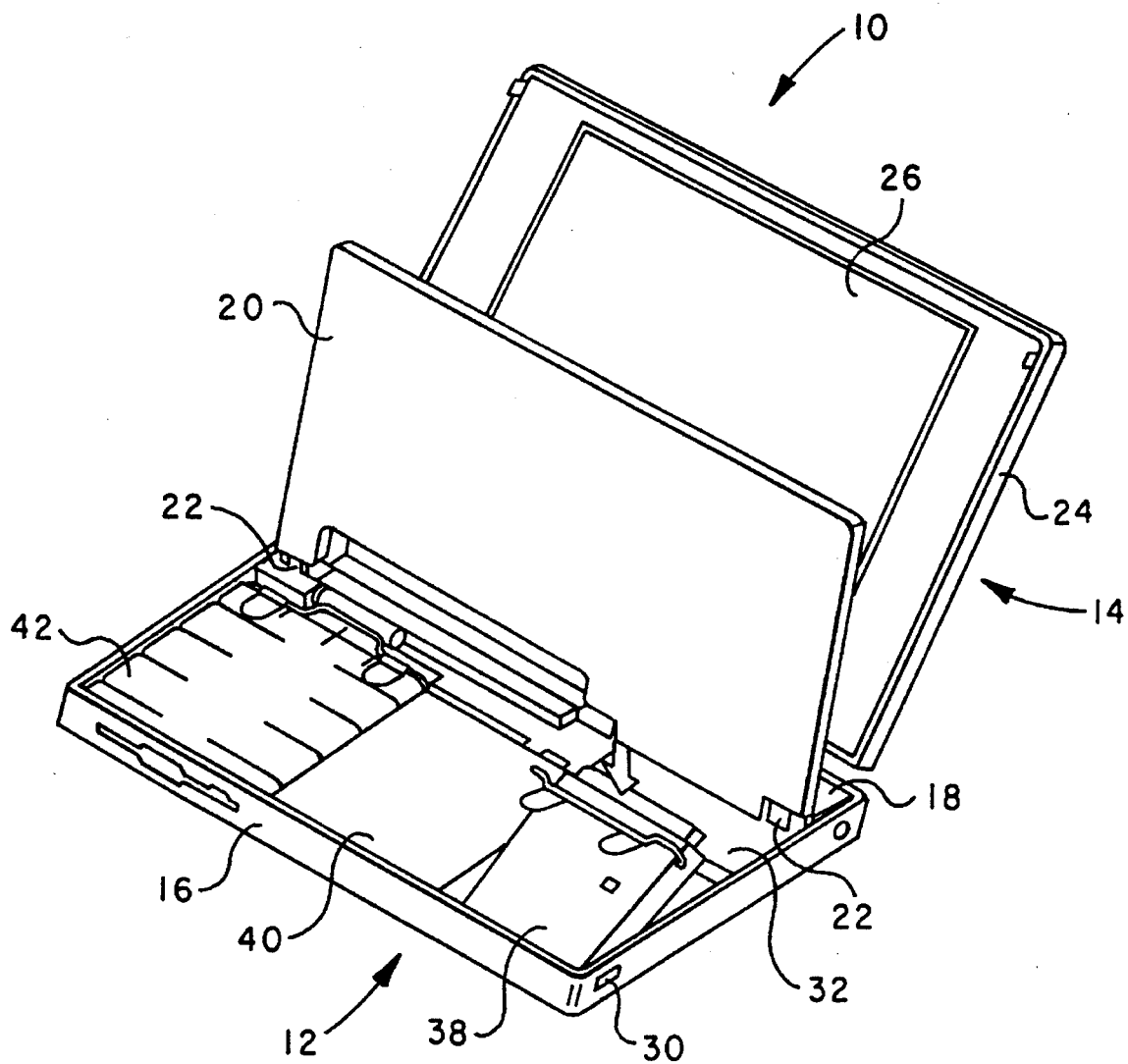
FIG. 2 is a schematic perspective view illustrating a state in which a keyboard of the notebook-type personal computer of FIG. 1 is open.

As illustrated in FIG. 2, partitioning wall 32, which is formed by a thin metal plate being bent into a predetermined configuration, is disposed at the rear side of the interior of case 16 of main body 12. The internal circuitry of personal computer 10, which includes the processing system, is accommodated within partitioning wall 32. Spaces for accommodating HDD (hard disk drive) pack 38, battery pack 40, and FDD (floppy disk drive) pack 42 are formed at the front side of partitioning wall 32. Packs 38, 40, 42 are freely installable in and removable from main body 12. In the installed state illustrated in FIG. 2 (in FIG. 2 , battery pack 40 and FDD pack 42 are installed), the respective packs are electrically connected to the processing system via unillustrated connectors.

A connector (unillustrated) for electrically connecting docking device 110 for a notebook-type personal computer (illustrated in FIG. 3 and referred to hereinafter as "docking device"), which will be described later, is provided at the reverse surface of main body 12. Ground terminals for grounding the system main body, FDD pack 42 and the like are provided in the connector.

Figure 9A:
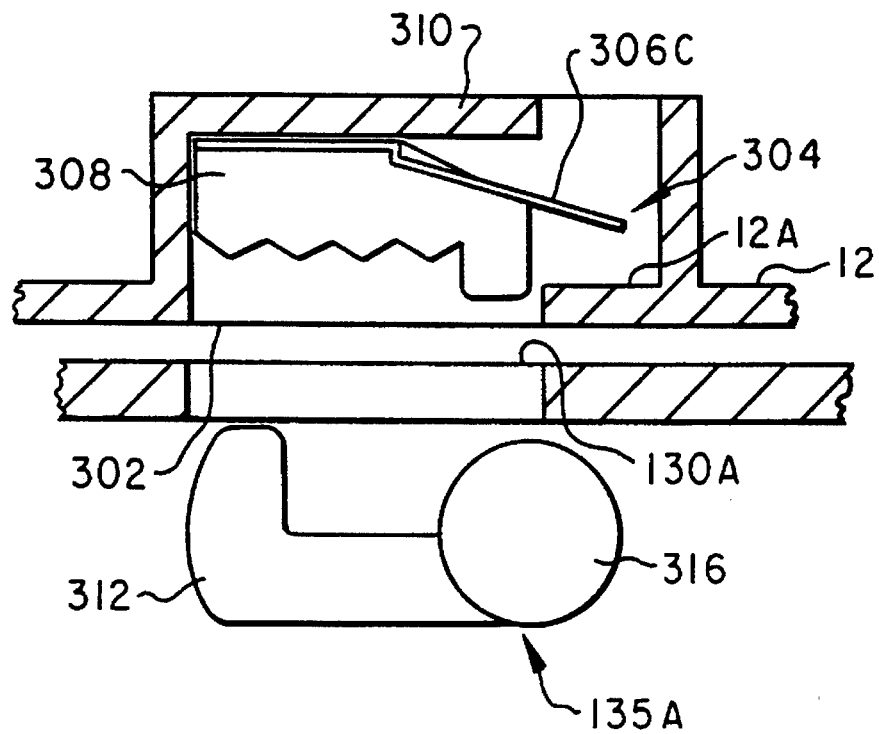
FIGS. 9A and 9B are operational views of a preferred embodiment of the present invention.
Figure 9B:
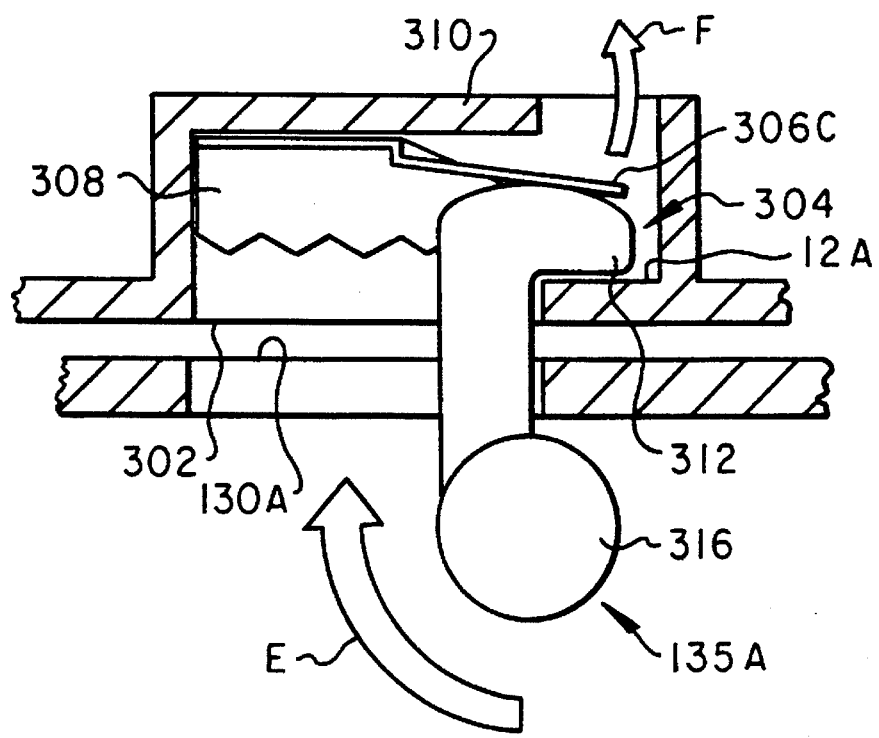

As illustrated in FIGS. 9A and 9B, a pair of substantially rectangular parallelopiped concave portions 302 is provided at the sides of the front side of the bottom surface of main body 12. Contact members 304, which relate to the present invention and which are used for electric connection with docking device 110, are disposed within concave portions 302.

Figure 8:
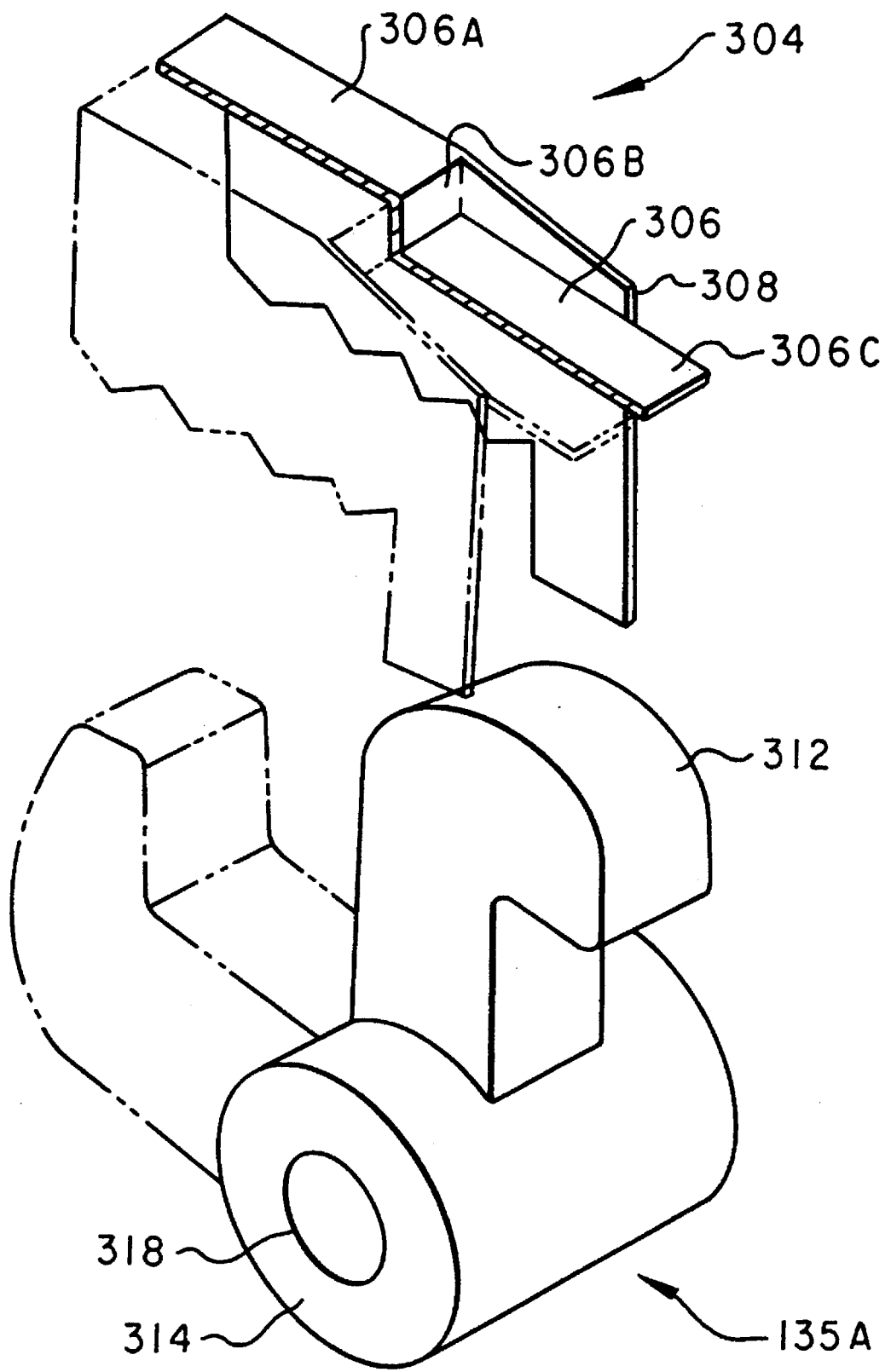
FIG. 8 is a perspective view of a contact member of the notebook-type personal computer and of the engagement member of the docking device relating to the embodiment of the present invention.

Contact member 304 is formed by bending an electrically conductive plate. As illustrated in FIG. 8, the contact member 304 is formed by a base portion 306, which has substantially the same width as that of the concave portion 302 and which acts as a plate spring, and a pair of supporting portions 308, which are continuous with a portion of the base portion 306 and whose lower end portions are formed in sawtooth configurations. Base portion 306 is formed of planar portion 306A, stepped portion 306B, and inclined portion 306C. Planar portion 306A is substantially rectangular and abuts edge surface 310 (see FIGS. 9A and 9B) of a portion at which concave portion 302 is provided. Stepped portion 306B is substantially rectangular and extends substantially orthogonally to and downwardly from one edge portion of the planar portion 306A, i.e., to the docking device side. Inclined portion 306C is substantially rectangular and is inclined downwardly from an edge portion of stepped portion 306B. Supporting portions 308 are continuous with side portions of the planar portion 306A of base portion 306. As supporting portions 308 move away from planar portion 306A, supporting portions 308 are inclined in directions of moving apart from each other. Contact member 304 is fit within the concave portion 302 by supporting portions 308 being pressed by the inner walls of concave portion 302 to the same width as concave portion 302. Because the surfaces of the inner walls of concave portions 302 are not coated, main body 12 and contact members 304 are electrically connected.

Protruding portion 12A is provided at concave portion 302 so as to protrude into the interior of concave portion 302. Protruding portion 12A abuts and engages engagement member 312 of docking device 110, which will be described later, when engagement portion 312 is in a protruded state.

Contact members 304 are connected to the ground portion (reference electric potential portion) of personal computer 10 via main body 12. Contact members 304, together with engagement members 312 of docking device 110, enable the electric connection of personal computer 10 and docking device 110.

Figure 3:
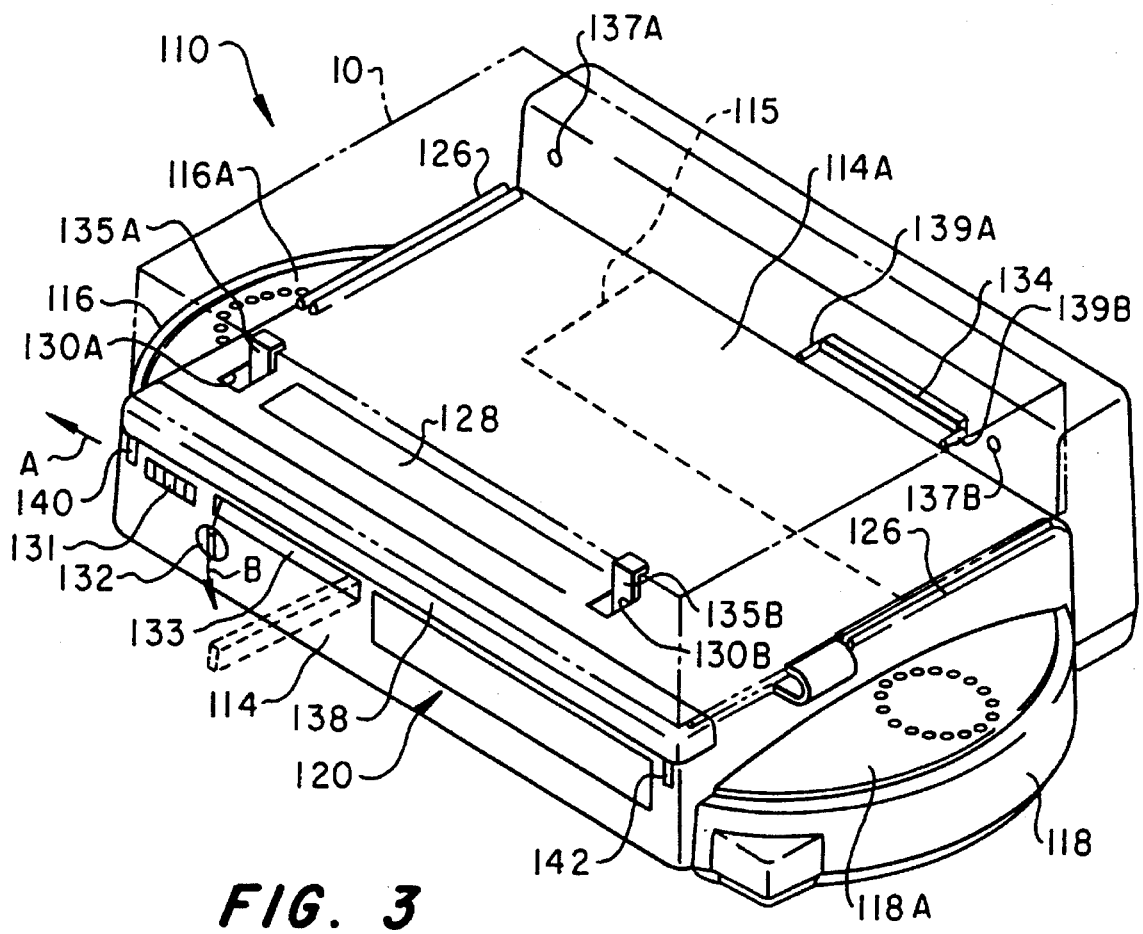
FIG. 3 is an exterior perspective view of the front of a docking device relating to an embodiment of the present invention.

FIG. 3 illustrates docking device 110 to which the personal computer 10 is electrically and mechanically connected.

Docking device 110 has hollow main body 120, at which personal computer 10 is loaded, supporting portion 114, and jutting portions 116 and 118 which jut out from the sides of supporting portion 114. Main body 120 is formed of an electrically conductive material such as nickel/copper (Ni—Cu) plating and has coated surfaces.

Jutting portions 116 and 118 have bottom surfaces, which are formed together with bottom cover 144 (see FIG. 5), which forms the bottom surface of supporting portion 114. Jutting portions 116 and 118 also have ceiling surfaces 116A and 118A, which are a step lower than ceiling surface 114A of supporting portion 114. Stereo speakers 122 and 124 (see FIG. 5) are located at substantially central positions of ceiling surfaces 116A and 118A oriented upwardly.

Handle 138, which slides in the forward/rearward directions of main body 120 and which is used for carrying, is provided at the front of supporting portion 114. Handle 138 is installed such that both longitudinal direction ends thereof are oriented in the forward/rearward directions at the side edges of supporting portion 114. Handle 138 is fixed by front edges of supporting arms 140 and 142 which are slidable along the side surfaces of the supporting portion 114. Other than serving as a handle for carrying, handle 138 also functions as an arm rest when the keyboard of personal computer 10 is operated.

Figure 4:
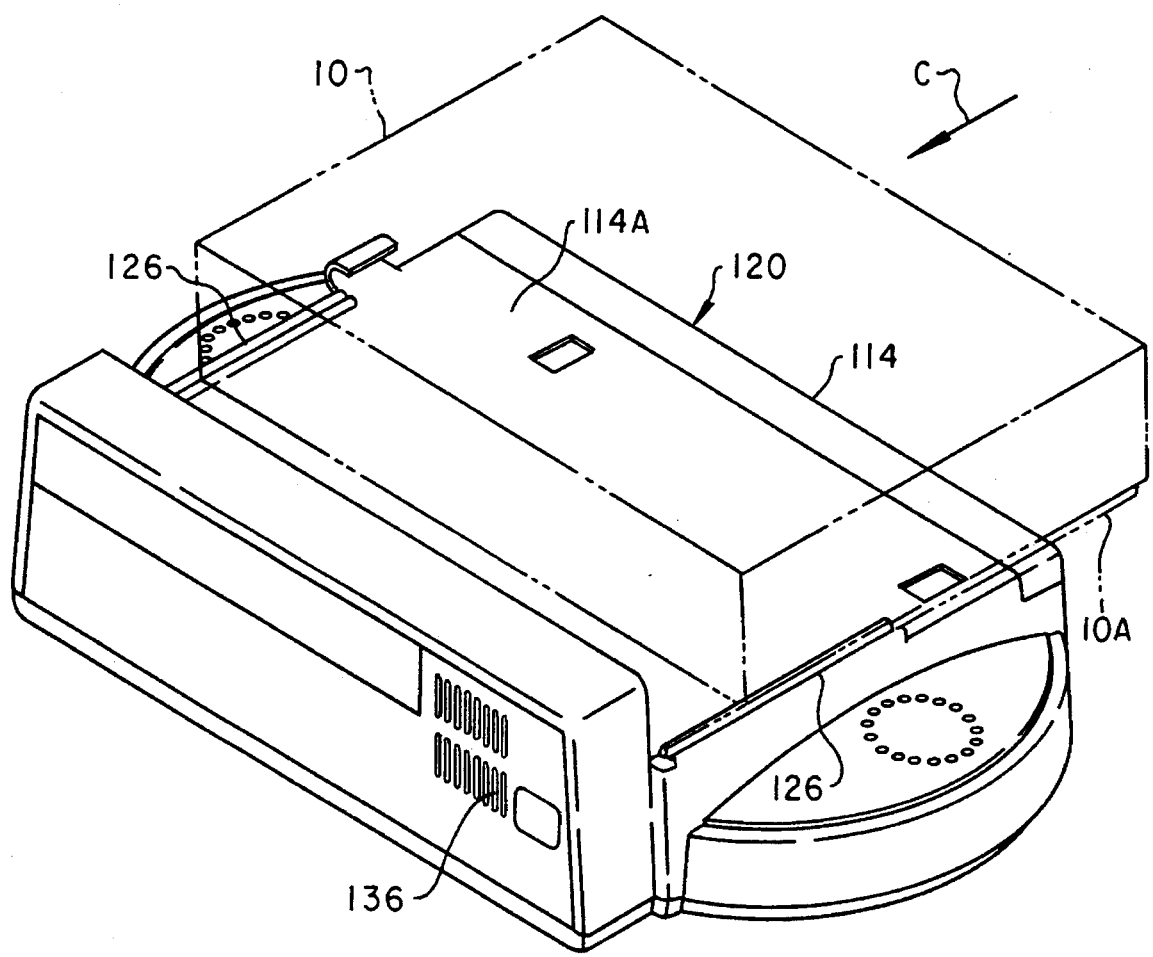
FIG. 4 is an exterior perspective view of the rear of the docking device of FIG. 3.

As shown in FIG. 3 and FIG. 4, the rear panel of supporting portion 114 protrudes further upwardly than the other portions of supporting portion 114. Substantially rectangular connector 134, which is used for electrical connection with an unillustrated connector provided on the reverse surface of personal computer 10, projects from the rear panel of supporting portion 114. Positioning pins 139A and 139B, which are utilized for positioning, project from the ends of connector 134. Ground terminals, which ground the electronic devices accommodated within main body 120 and which are connected to the ground terminals of the connector of personal computer 10, are provided in connector 134. Circular holes 137A and 137B are formed in the rear panel of supporting portion 114. Eject pins (unillustrated) for ejecting loaded personal computer 10 can project from and withdraw into holes 137A and 137B by the operation of eject lever 133 which will be described later.

Line protrusions 126 are provided on ceiling surface 114A of supporting portion 114 along forward/rearward directions of main body 120. Two of line protrusions 126 are provided at each side of ceiling surface 114A and are spaced apart by a predetermined interval. Protrusion 10A (see FIG. 4), which protrudes downwardly from the bottom surface of personal computer 10, fits into the concave groove formed between line protrusions 126 on one side (the left side in FIG. 3) of main body 120 when personal computer 10 is loaded on ceiling surface 114A of supporting portion 114. Similarly, a protrusion protruding downwardly from the bottom surface of personal computer 10 fits into the concave groove formed between line protrusions 126 on the other side of main body 120 when personal computer 10 is loaded on the ceiling surface 114A of supporting portion 114.

A long, thin rectangular label 128 is affixed to the ceiling surface 114A of supporting portion 114 in the transverse direction. Rectangular openings 130A and 130B are provided at the ends of label 128 at positions directly beneath concave portions 302 (see FIGS. 9A and 9B) of the bottom surface of personal computer 10 when personal computer 10 is in a completely loaded state. Engagement members 135A and 135B, used to mechanically and electrically connect personal computer 10 and docking device 110, project from openings 130A and 130B.

As both of the engagement members 135A and 135B have the same structure, engagement member 135A will be described. Engagement member 135A is formed of an electrically conductive material such as galvanized iron, stainless steel, or the like. As illustrated in FIG. 8, engagement member 135A is composed by substantially L-shaped engagement portion 312 and cylindrical connecting portion 314 which is fixed to engagement portion 312. Circular hole 318 is formed in the center of connecting portion 314. As shown in FIG. 9, rotation shaft 316, which is formed as an electrically conductive member, is inserted into hole 318. Due to operation of eject lever 133 which will be described later, engagement member 135A rotates around rotation shaft 316 so as to be able to withdraw and protrude from the state illustrated in FIG. 9A, in which engagement member 135A is withdrawn in the opening 130A, to the state illustrated in FIG. 9B, in which engagement member 135A protrudes out from opening 130A. Engagement member 135A is connected to the ground portion (reference electric potential portion) of docking device 110 via rotation shaft 316. In the state in which personal computer 10 is loaded and fixed, engagement member 135A, together with contact members 304 of personal computer 10, electrically connects personal computer 10 and docking device 110.

As shown in FIG. 3, stopper 131, keyhole 132 and eject lever 133 are provided in the front surface of main body 120. Stopper 131 is substantially rectangular and is movable in left and right directions with respect to main body 120. Eject lever 133 has a substantially rectangular shape. Due to the interlocking of eject lever 133 with stopper 131, eject lever 133 can project forwardly (in the direction of arrow B) from main body 120 along a plane parallel to ceiling surface 114A of supporting portion 114.

Eject lever 133 is connected to two unillustrated joints within main body 120. One of the joints is connected to engagement members 135A and 135B via rotation shafts 316. The other joint is connected, via an unillustrated pipe and link, to the eject pins (unillustrated) which are used to eject personal computer 10. In this way, by fitting eject lever 133 into main body 120, engagement members 135A and 135B protrude out from openings 130A and 130B so as to become engageable with contact members 304 of personal computer 10 (see FIG. 9B) and the eject pins are withdrawn into the holes 137A and 137B. By moving stopper 131 to the left (in the direction of arrow A) so that eject lever 133 protrudes forwardly (in the direction of arrow B) from main body 120 at an angle of less than or equal to 30 degrees, engagement members 135A and 135B are withdrawn from the interiors of openings 130A and 130B (see FIG. 9A) while the eject pins remain in their withdrawn state. When eject lever 133 projects forwardly (i.e., in the direction of arrow B) from main body 120 at an angle of 30 to 60 degrees, the eject pins protrude from holes 137A and 137B and personal computer 10 is ejected.

By inserting an unillustrated key into keyhole 132 and turning the key while eject lever 133 is fit in main body 120, eject lever 133 is set in a locked state. In this way, personal computer 10 cannot be removed from docking device 110. In order to prevent the key from being lost, it is preferable for the key to be structured so that it can be removed only when necessary.

As illustrated in FIG. 4, a plurality of vertically-extending rectangular slits 136 are formed in the reverse surface of the main body 120. A fan for cooling (unillustrated) is accommodated in the interior of the main body 120 at the portion where the slits 136 are formed.

The interior structure of docking device 110 will now be described with reference to the exploded perspective view depicted in FIG. 5.

Main body 120 is composed of main cabinet 150, rear cover 152, lid 154, and bottom cover 144.

Main cabinet 150 is formed integrally with the front wall and top of supporting portion 114, the top and side wall of jutting portion 118, and the side wall of jutting portion 116. Bottom cover 144 engages with the bottom portion of main cabinet 150 and forms the bottom surface of main body 120. Further, lid 154 engages with the upper surface of the left edge portion of main cabinet 150 and forms the upper surface of the jutting portion 116 and a portion of the rounded wall thereof. Main cabinet 150, bottom cover 144, and lid 154 are connected by a suitable fixing means such as screws or the like.

Figure 6:
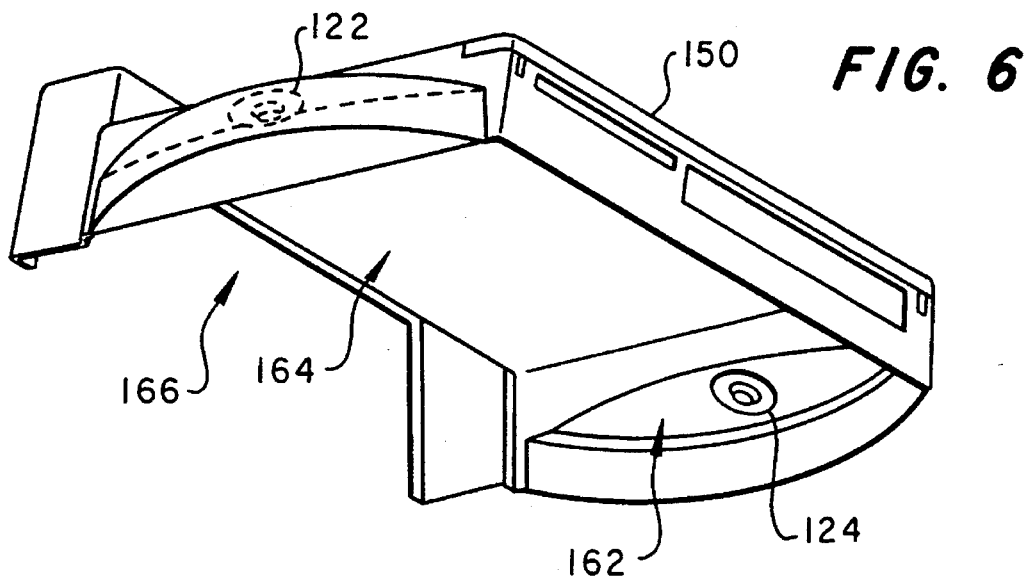
FIG. 6 is perspective view, as seen from below, of a main cabinet of FIG. 5 in which stereo speakers are built.

Bay area 162 depicted in FIG. 6, which accommodates devices such as CD-ROM 158, is located in the interior right half portion of main cabinet 150. Main chassis 160 shown in FIG. 5 is accommodated within bay area 162 and is fixed to the inner surface of main cabinet 150. CD-ROM 158 is inserted, from the direction of arrow D, into main chassis 160 via front opening 170. Protrusion 172A of metal attachment 172 provided on a side surface of CD-ROM 158 fits with and is latched into hole 160A formed in a side surface of main chassis 160. Guide 160B, which is used when CD-ROM 158 is inserted, is provided at the inner side surface of main chassis 160.

A power supply accommodating area 164 shown in FIG. 6 is formed at the substantially left half portion of the interior of main cabinet 150. Power supply 174 is accommodated within power supply accommodating area 164 next to CD-ROM 158.

Main PCB (substrate) 176 having an L-shaped cross-section is accommodated behind and beneath the portion of main cabinet 150 at which CD-ROM 158 and power supply 174 are accommodated. Busses of various types are formed within main PCB 176, but are not illustrated in FIG. 5. As will be explained later, various devices may be connected as options to main PCB 176.

Connector 178 for connecting an AT bus card is attached to the lower portion of standing portion 176A of main PCB 176 so that full-size AT bus card 180 maybe connected via connector 178. When full size AT bus card 180 is connected, it is positioned beneath CD-ROM 158 and power supply 174 with one longitudinal direction end portion thereof jutting out beneath speaker 122.

I/O area 166 illustrated in FIG. 6 is located at an inner space of the rear portion of main cabinet 150. I/O substrate 184 for input/output interface (I/O interface), which opposes connector 134 and is fixed by a substantially U-shaped bracket 182 is accommodated within I/O area 166. When personal computer 10 is docked to docking device 110 and is used as a desktop-type computer, various interfaces, such as a serial interface, a parallel interface, an interface for FDD, an interface for KBD, an interface for a mouse, an SCSI and the like, are provided by I/O substrate 184.

Laminated AD/VGA substrate 186 is attached to the bottom surface of main PCB 176.

Figure 5:
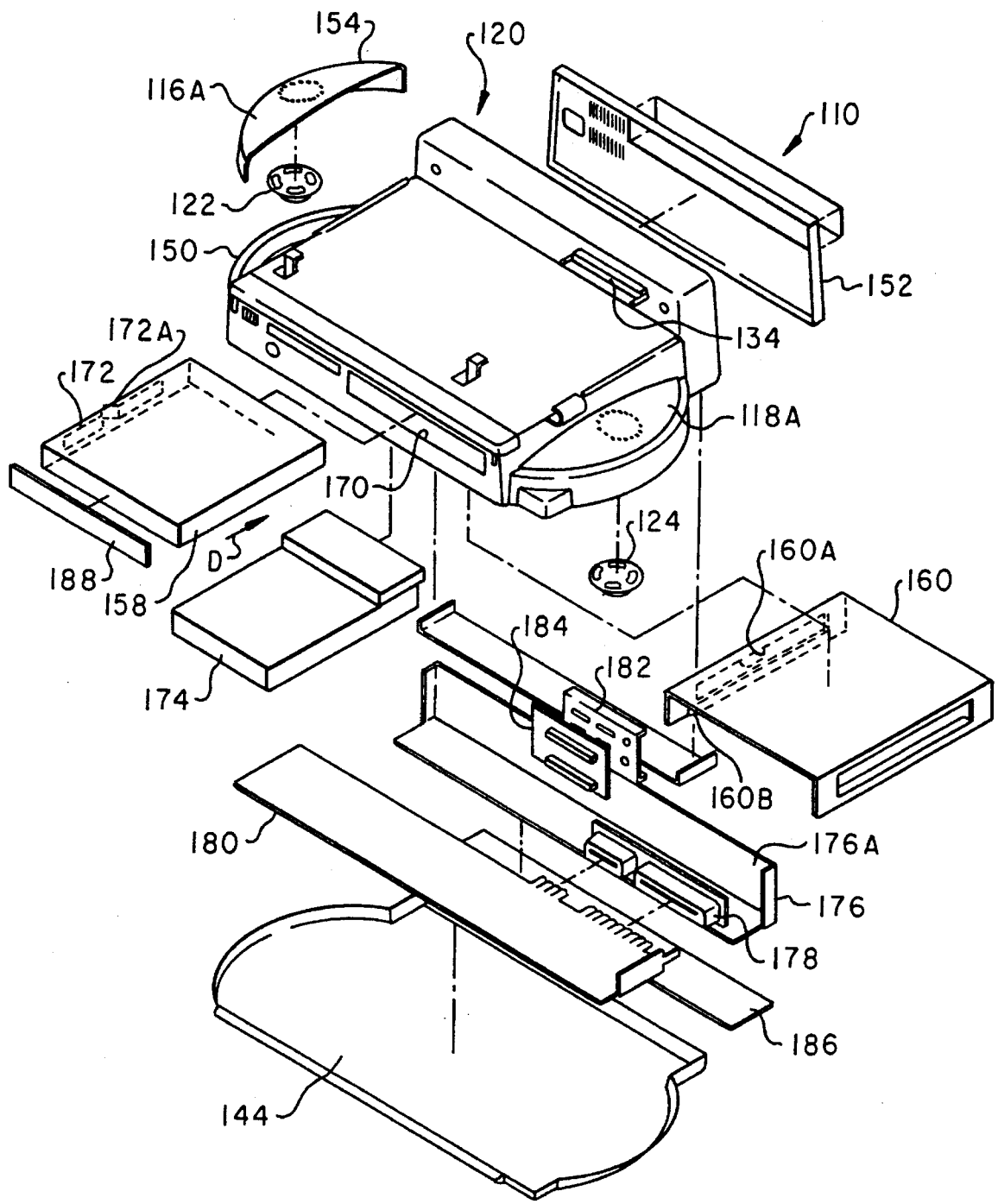
FIG. 5 is an exploded perspective view of the docking device of FIG. 3 in which a portion thereof is omitted.

In FIG. 5, reference numeral 188 represents a front cover. Front cover 188 is attached to front opening 170, which is used for insertion of CD-ROM 158, so as to be able to open and close. Various cables are omitted from FIG. 5 in order to avoid complicating the drawing.

Figure 7:
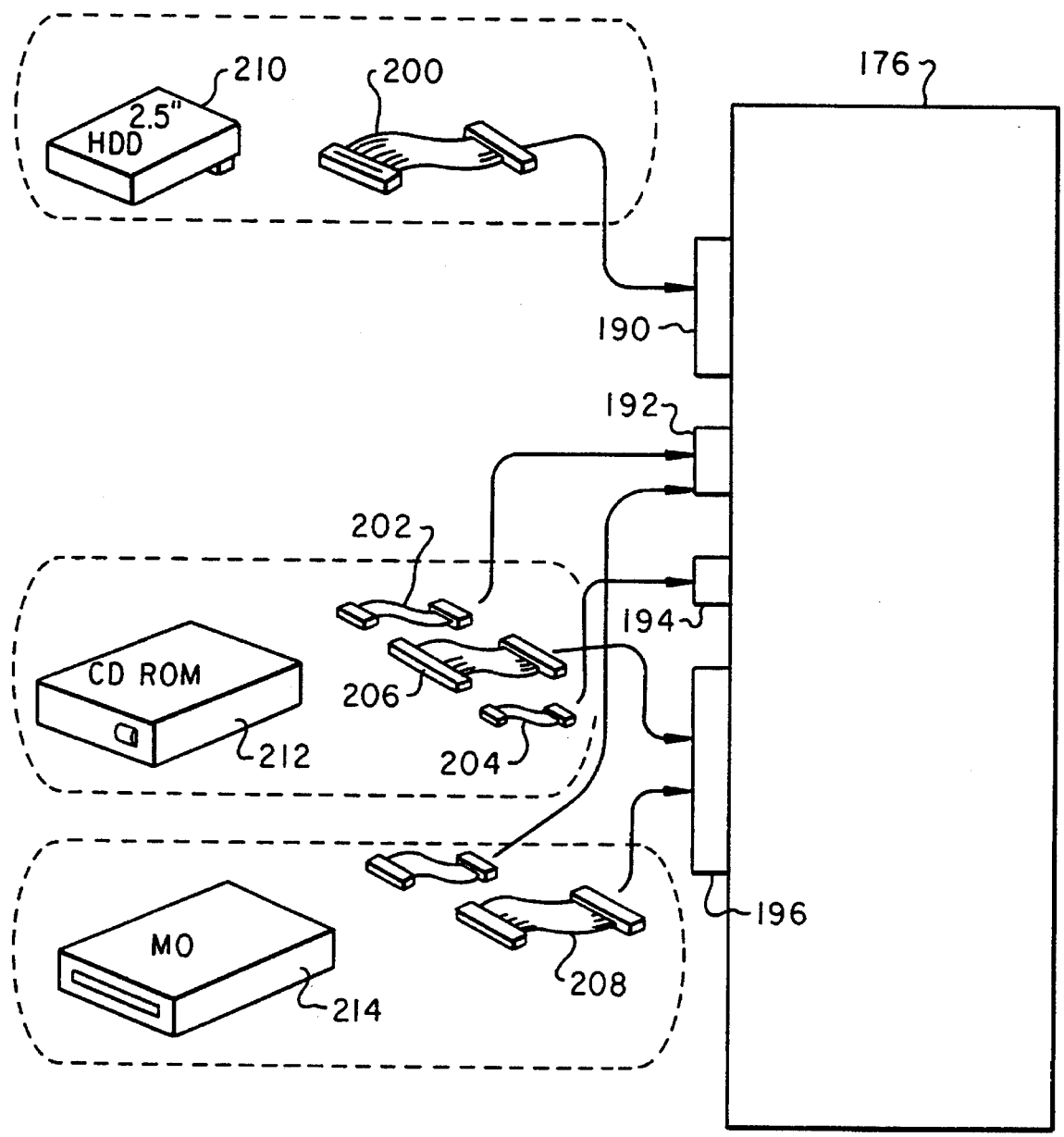
FIG. 7 illustrates an example of optional devices which can be connected to a main PCB of FIG. 5.

FIG. 7 illustrates main PCB 176 and an example of options to which main PCB 176 can be connected.

A 150-pin AT bus connector 190, a 4-pin power connector 192, a 4-pin audio connector 194, and a 50-pin SCSI bus connector 196 are provided at main PCB 176.

A 2.5 inch HDD (hard disk drive) 210 is connected to AT bus connector 190 via cable connector 200 (50 pins). CD-ROM 212 is connected to power connector 192 and to audio connector 194 via cable connectors 202 and 204 (4 pins). CD-ROM 212 is connected to SCSI bus connector 196 via 34-pin cable connector 206. Further, MO 214 is connected to the SCSI bus connector 196 via 34-pin cable connector 208. Another CD-ROM may be connected in place of MO 214.

Optional devices which may be connected to main PCB 176 are not limited to the above devices. However, it is desirable that the respective heights of the optional devices are less than or equal to one inch so that docking device 110 does not become large (e.g., docking device 110 is limited to a size of about 410 mm×250 mm×103 mm). Further, it is preferable from the standpoint of ease of carrying that the entire weight of docking device 110 after the optional devices have been installed is less than or equal to 2.8 kg. Next, the operation of a preferred embodiment having the above-described structure will be described.

As shown in FIG. 3, stopper 131 is moved to the left. When eject lever 133 is extended from main body 120 as indicated by the broken line, engagement members 135A and 135B of docking device 110 are withdrawn into main body 120 (see FIG. 9A). In this state, as illustrated in FIG. 4, protrusion 10A provided on the bottom surface of personal computer 10 fits into the concave groove formed between line protrusions 126 and 126 which are provided at both ends of ceiling surface 114A of supporting portion 114 of main body 120. Personal computer 10 may then be pushed in the direction of arrow C and slid onto ceiling surface 114A so that personal computer 110 is completely loaded on supporting portion 114 as illustrated in FIG. 3. As personal computer 10 is sliding into its loaded position, the connector (unillustrated) provided at the reverse surface of personal computer 10 is connected with connector 134 of docking device 110 with positioning pins 139A and 139B serving as guides, so that personal computer 10 and docking device 110 are electrically connected via these connectors. In this state, as illustrated in FIG. 9A, concave portions 302 of personal computer 10 are positioned directly above openings 130A and 130B of docking device 110, while engagement members 135A and 135B remain withdrawn within openings 130A and 130B (opening 130B and engagement member 135B are omitted from FIG. 9A).

As illustrated in FIG. 9B, when eject lever 133 is fit into main body 120 of docking device 110 from the position illustrated by the broken line in FIG. 3 engagement portions 312 of engagement members 135A and 135B are pivoted in the direction of arrow E around rotation shafts 316 inserted into holes 318 of connecting portions 314. Engagement portions 312 will then protrude from openings 130A and 130B and pass between supporting portions 308 (see FIG. 8) of contact members 304, said contact members 304 located within concave portions 302 of personal computer 10. As illustrated in FIG. 9B, the bottom surfaces of inclined portions 306C of base portions 306 and the top surfaces of engagement portions 312 abut. While engagement portions 312 push inclined portions 306C in the direction of arrow F against the downward force of inclined portions 306C, engagement portions 312 pivot until the bent portions thereof abut protruding portions 12A which protrude within concave portions 302. In this way, personal computer 10 is fixed to docking device 110.

In the state in FIG. 9B, the top surfaces of engagement members 135A and 135B, which are connected to the ground portion of docking device 110, contact the bottom surfaces of inclined portions 306 of contact members 304, which are connected to the ground portion of personal computer 10. Engagement members 135A and 135B and contact members 304 contact each other over fixed surface areas at positions spacially separated from the connector between to the personal computer 10 and docking device 110. Engagement members 135A and 135B and contact members 304 are connected by low impedance. As a result, the electric potential difference and displacement current between docking device 110 and personal computer 10 can be eliminated. In addition, radiated emission noise can be suppressed.

In order to effectively reduce radiated emission noise, engagement members 135A and 135B and contact members 304 should be provided at positions which are as far as possible from the connector. Referring to FIG. 3, it is preferable to locate engagement members 135A and 135B at positions outside of the rectangular area marked off by broken line 115 on ceiling surface 114A. Contact members 304 should be located at positions on the bottom surface of personal computer 10 corresponding to these positions. However, when the distance from the connector to engagement members 135A and 135B (and consequently contact members 304) corresponds to a length which is one-quarter of a wavelength of a problematic high frequency (30 MHz to 1 GHz), resonance may occur. Therefore, engagement members 135A and 135B and contact members 304 should not be provided at a distance which is one-quarter wavelength of any frequency within this range.

In the above-described embodiment, the engagement members and the contact members are provided at two places at the personal computer and the docking device, respectively. However, the present invention is not limited to these members being provided at two places; they may be provided at one place or at three or more places.

In a preferred embodiment of the present invention, the entire bottom surface of the personal computer may be made to contact the entire top surface of the docking device so that the personal computer and the docking device are electrically connected.

Furthermore, a connector may be provided at each position at which engagement members 135A and 135B and contact members 304 are provided, and these connectors may be connected.

While the invention has been particularly shown and described with reference to a preferred embodiment, it will be understood by those skilled in the art that various changes in form and detail may be made therein without departing from the spirit and scope of the invention.

What is claimed is:

1. A grounding apparatus within a portable computer for minimizing displacement currents when said portable computer is electrically connected and mechanically fixed to a docking device for a portable computer, said portable computer and said docking device each having a main body which houses a plurality of electrical components, said docking device having an engagement member that is electrically connected to a reference electric potential portion of said main body of said docking device and which mechanically fixes said portable computer to said docking device, said portable computer having an electrical signal connector which transmits electrical signals between said plurality of electrical components within said portable computer and said plurality of electrical components within said docking device, said grounding apparatus comprising:

an electrical contact disposed within a recess in said main body of said portable computer, said electrical contact including a body electrically connected to a reference electrical potential portion of said body of said portable computer and a spring arm which contacts said engagement member of said docking device when said portable computer is mechanically fixed to said docking device, wherein said electrical contact is spaced apart from said electrical signal connector.

2. A grounding apparatus within a docking device for a portable computer for minimizing displacement currents when said docking device is electrically connected and mechanically fixed to a portable computer, said portable computer and said docking device each having a main body which houses a plurality of electrical components, said docking device having an electrical signal connector which transmits electrical signals between said plurality of electrical components within said docking device and said plurality of electrical components within said portable computer, said grounding apparatus comprising:

an engagement member having an L-shaped arm, wherein when said engagement member is located at an engaged position at which said portable computer is mechanically fixed to said docking device, said engagement member contacts a region disposed within a recess in said main body of said portable computer that is electrically connected to a reference electric potential portion of said main body of said portable computer and frictionally engages an interior surface of said recess, wherein said region is spaced apart from said electrical signal connector.

3. The grounding apparatus within a docking device for a portable computer of claim 2, said L-shaped arm having a retracted position, wherein when said L-shaped arm is at said retracted position, said L-shaped arm is retracted within said main body of said docking device for a portable computer.

4. A system for electrically connecting a portable computer and a docking device at which said portable computer is mechanically fixed, said system comprising:

an electrical connector within said portable computer for transmitting signals between said portable computer and said docking device;

an engagement member provided at a main body of said portable computer and electrically connected to a reference electric potential portion of said main body of said portable computer, wherein said engagement member mechanically fixes said portable computer to said docking device; and a region disposed within a recess in a main body of said docking device, said region including a body electrically connected to a reference electric potential portion of said main body of said docking device and a spring arm which contacts said engagement member at a location substantially distant from said electrical connector.

5. The system for electrically connecting a portable computer and a docking device of claim 4, said engagement member comprising:

an L-shaped arm, wherein when said L-shaped arm is located at an engaged position, said L-shaped arm frictionally engages an interior surface of said recess in said main body of said docking device and is electrically connected to said region.

6. The system for electrically connecting a portable computer and a docking device of claim 5, said L-shaped arm having a retracted position, wherein when said L-shaped arm is at said retracted position, said L-shaped arm is retracted within said main body of said portable computer.

7. A system for electrically connecting a portable computer and a docking device at which said portable computer is mechanically fixed, said docking device having connections for expanding various functions of said portable computer, said system comprising:

an electrical connector within said docking device for transmitting signals between said docking device and said portable computer;

an engagement member provided at a main body of said docking device and electrically connected to a reference electric potential portion of said main body of said docking device, wherein said engagement member mechanically fixes said portable computer to said docking device; and a region disposed within a recess in a main body of said portable computer, said region including a body electrically connected to a reference electric potential portion of said main body of said portable computer and a spring arm which contacts said engagement member at a location substantially distant from said electrical connector.

8. The system for electrically connecting a portable computer and a docking device of claim 7, said engagement member comprising:

an L-shaped arm, wherein when said L-shaped arm is located at an engaged position, said L-shaped arm frictionally engages an interior surface of said recess in said body of said portable computer and is electrically connected to said region connected to said reference electrical potential portion of said main body of said portable computer.

9. The system for electrically connecting a portable computer and a docking device of claim 8, said L-shaped arm having a retracted position, wherein when said L-shaped arm is at said retracted position, said L-shaped arm is retracted within said main body of said docking device for a portable computer.

* * * * *